Dec. 21, 1948.　　　E. D. HANSON ET AL　　　2,456,699
APPARATUS FOR SHEARING STRIPS OF PLASTIC MATERIAL
Filed Oct. 19, 1946　　　2 Sheets-Sheet 2
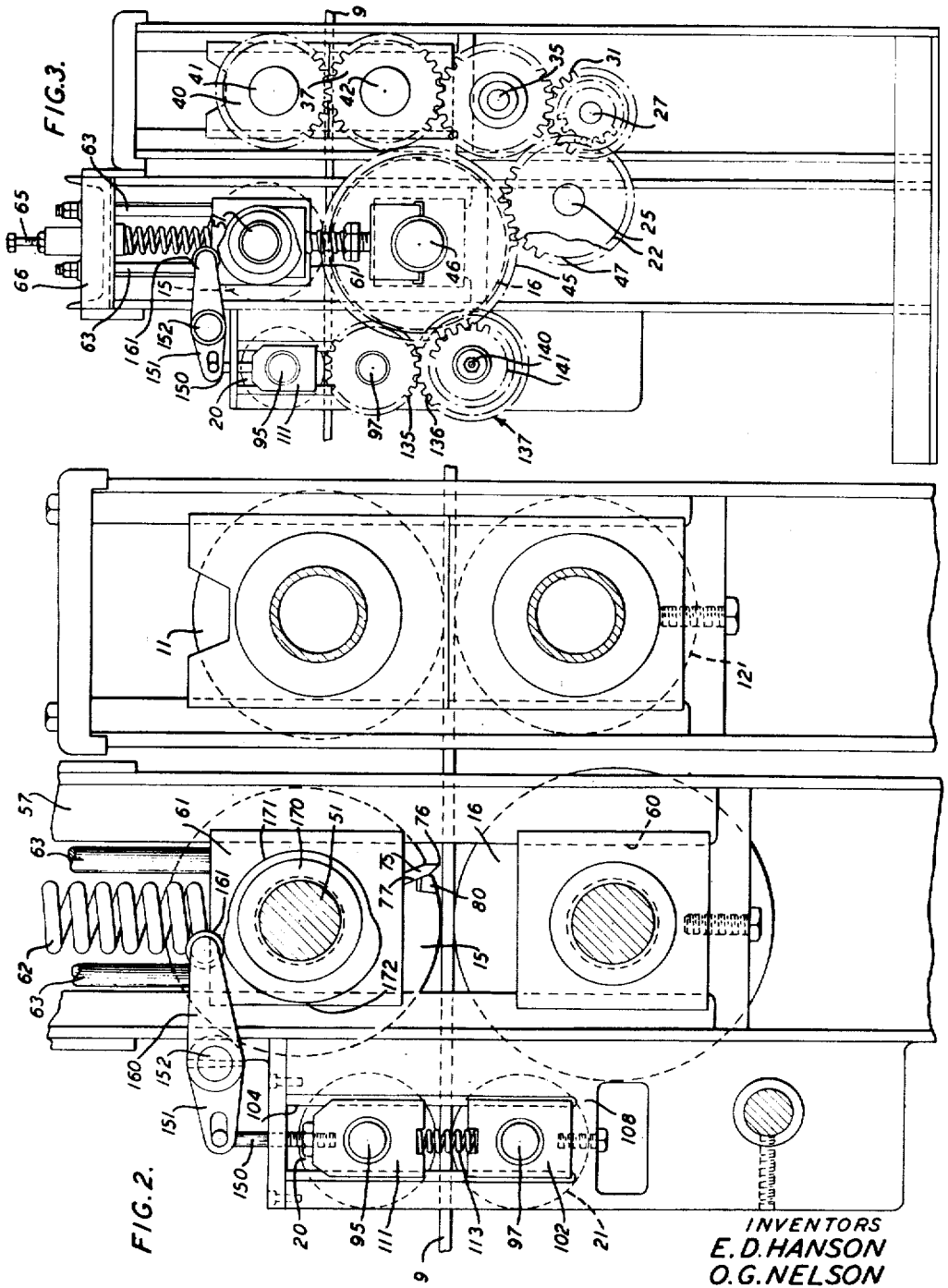
INVENTORS
E. D. HANSON
O. G. NELSON
BY
ATTORNEY Patented Dec. 21, 1948

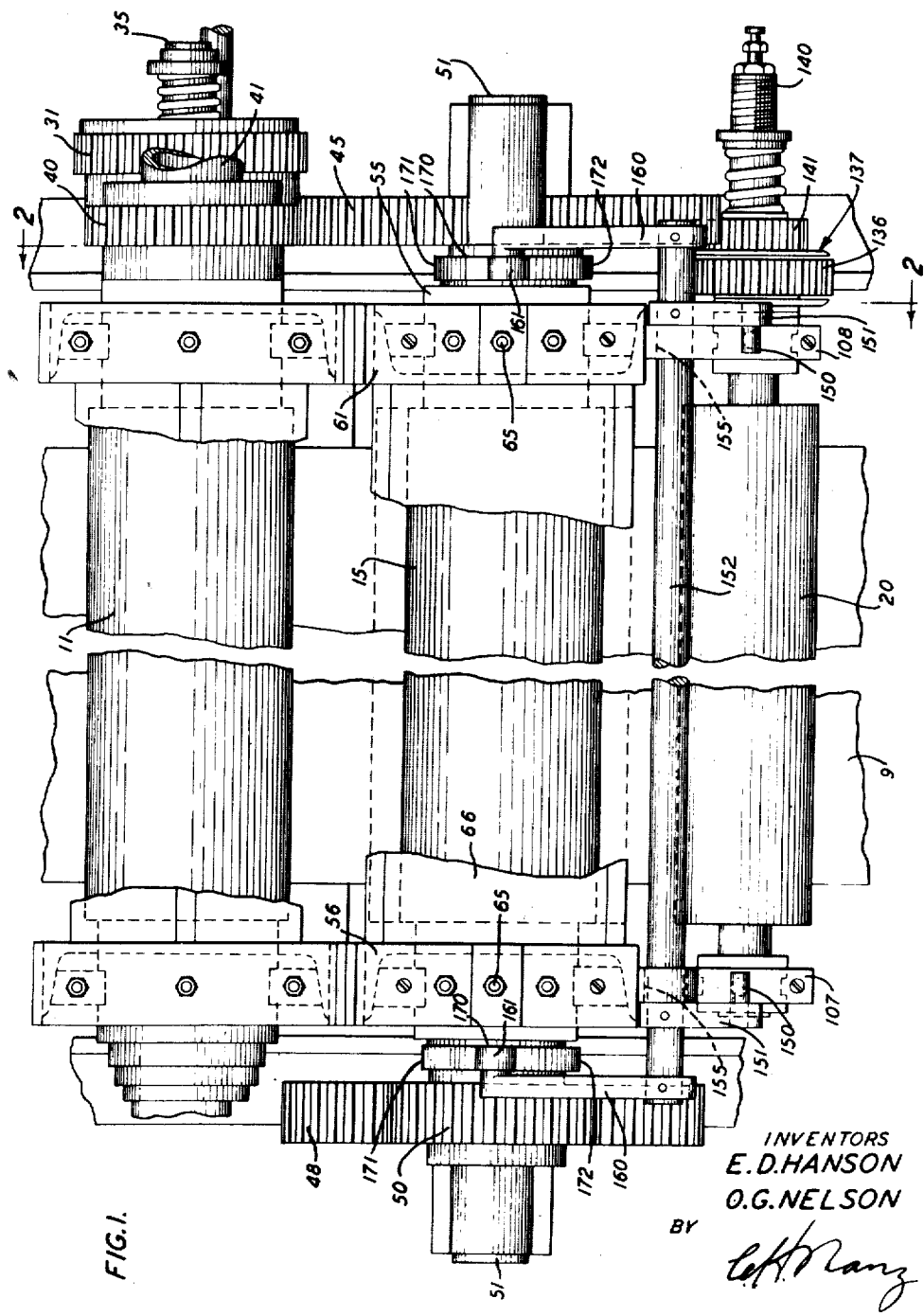

2,456,699

UNITED STATES PATENT OFFICE 2,456,699

APPARATUS FOR SHEARING STRIPS OF PLASTIC MATERIAL

Estyle D. Hanson and Oscar G. Nelson, Baltimore, Md., assignors to Western Electric Company, Incorporated, New York, N. Y., a corporation of New York Application October 19, 1946, Serial No. 704,372

13 Claims. (Cl. 164—84.5)

1

This invention relates to apparatus for shearing strips of plastic material and has for its object the provision of new and improved apparatus for shearing such strips.

In processing plastic material, such as rubber or rubber-like compounds, the plastic material sometimes is milled and is sheeted off in long strips which are cut into short segments for convenience in subsequent handling and processing. In the past, it has been difficult to shear such strips into segments while advancing the strips continuously.

An apparatus forming one embodiment of the invention includes a pair of feed rolls for feeding a strip of plastic material to a pair of shear rolls. A pair of tailer rolls positioned on the discharge side of the shear rolls are driven substantially faster than the shear rolls. The feed rolls are driven slower than the shear rolls so that the portion of the strip between the feed rolls and the shear rolls is placed under tension between the shears by the shear rolls. One of the tailer rolls is movable toward and away from the other tailer roll. When the movable tailer roll is moved away from the other tailer roll, the tailer rolls do not grip the strip. However, between shearing actions of the shear rolls, a cam forces the movable tailer roll toward the other roll so that the two tailer rolls grip the strip therebetween, and since they are rotated at greater speeds than the shear rolls, they build up tension in the portion of the strip between the shear rolls and the tailer rolls so that when the shearing action occurs, the strip is under high tension which facilitates the shearing action.

A complete understanding of the invention may be obtained from the following detailed description of an apparatus constituting a specific embodiment thereof, when read in conjunction with the appended drawings, in which:

Fig. 1 is a fragmentary, top plan view of the apparatus;

Fig. 2 is a vertical section taken along line 2—2 of Fig. 1, and

Fig. 3 is a side view of the apparatus.

Referring now in detail to the drawings, a strip 9 (Fig. 2) composed of a plastic material, such as an insulating compound containing rubber or a rubber-like material, is advanced through a shearing apparatus which severs the strip into segments. The shearing apparatus includes a pair of inrunning feed rolls 11 and 12 which feed the strip 9 into the bite of shear rolls 15 and 16, of which the roll 15 is a blade roll and the roll 16 is an anvil roll. The shear rolls advance the strip to a pair of inrunning tailer rolls 20 and 21.

An idler gear 22 (Fig. 3) secured to an idler shaft 25 engages a gear 26 secured to a drive shaft 27, and is driven by the shaft 27, which is driven at a predetermined rate of speed by suitable driving means (not shown) in a counterclockwise direction, as viewed in Fig. 3. A gear 30 secured to the drive shaft 27 engages a gear 31 of a suitable adjustable friction clutch 32, which is mounted on a bearing post 35 and serves to transmit a predetermined amount of force without slipping to a gear (not shown) which is also mounted on the bearing post 35. This latter gear meshes with a gear 37, which in turn meshes with a gear 40. The gear 40 is secured to a shaft 41 upon which the feed roll 11 is mounted, and the gear 37 is secured to a shaft 42 upon which the feed roll 12 is mounted.

Since the shaft 27 is driven at a predetermined rate of speed, the feed rolls 11 and 12 are driven in opposite directions at equal predetermined rates of speed and advance the strip 9 to the left, as viewed in Fig. 3. A gear 45 secured to a shaft 46 which mounts the anvil roll 16 thereon meshes with a gear 47 rigidly connected to the shaft 45 and drives the shaft 46 when the shaft 25 is driven whereby the anvil roll is rotated. A gear 48 (Fig. 1) secured to the shaft 46 meshes with a gear 50 secured upon a shaft 51, upon which shaft the blade roll 15 is mounted. The shaft 46 is rotatably mounted in slotted journal boxes 55—55, which are bolted to side frame members 56 and 57 at the bottom of guideways formed therein, of which is shown a guideway 60 formed in the side frame member 57 (Fig. 2). The shaft 51 is mounted in slotted journal boxes 61—61 (Fig. 1) which are pressed toward the journal boxes 55—55 by strong compression springs of which a compression spring 62 is shown, which compression springs are positioned between the journal boxes 61—61 and adjusting bolts, of which an adjustable bolt 65 (Fig. 3) is shown, secured adjustably to a tie cap 66. The bolts 65—65 may be adjusted to vary the force placed on the compression springs 62—62. The journal boxes 61—61 are urged toward the journal boxes 55—55 so that the blade roll 15 is urged toward the anvil roll 16. However, the movement of the blade roll toward the anvil roll is limited by stay rods 63—63.

A blade 75 (Fig. 2) having a blunt severing edge 76 formed thereon is secured by a clamping bolt 80 in a slot 77 formed in the blade roll 15. When the drive shaft 27 (Fig. 3) is driven, the shear rolls 15 and 16 (Fig. 2) are rotated at a peripheral rate of speed which tends to advance the strip 9 from the feed rolls 11 and 12 at a rate of speed approximately 20% faster than that at which the feed rolls advance the strip, whereby the portion of the strip between the feed rolls and shear rolls is tensioned. The rate of speed of the blade roll 15 is such that the linear rate of speed in the severing edge 76 of the blade 75 is from 35% to 50% greater than the peripheral rate of speed of the anvil roll 16. This plus the fact that the gear 50 (Fig. 1), which drives the blade roll, is driven by the gear 48 which is rigidly connected with the anvil roll eliminates all backlash between the gears 50 and 51. Hence, when the blade engages the strip, the blade rubs the strip over the anvil roll. The blunt severing edge 76 of the blade serves to pinch the strip into a membrane when it is moved to a position pointing radially toward the anvil roll 16, in which position the blunt severing edge compresses the strip to a thin membrane.

The tailer rolls 20 and 21 (Fig. 2) are mounted on shafts 95 and 97. The shaft 97 is rotatably mounted in slotted journal boxes, of which a slotted journal box 102 is shown, mounted in guideways, of which a guideway 104 is shown, formed in frame members 107 and 108. A pair of slotted journal boxes, of which a journal box 111 is shown, serve to mount the shaft 95 above the shaft 97. The journal boxes 102—102 are bolted to the bottoms of the guideways 104—104. Compression springs, of which a compression spring 113 is shown, urge the slotted journal boxes 111—111 away from the journal boxes 102—102. A gear 135 secured to the shaft 97 meshes with a gear 136 of a suitable adjustable friction clutch 137, which is mounted upon a bearing post 140 and is secured to a gear 141. The gear 141 is rotatably mounted on the bearing post 140 and meshes with the gear 45. When the drive shaft 27 is driven, the gear 45 is driven so that it drives the gear 135 through the gear 140 and the friction clutch 137, whereby the tailer roll 21 is rotated in a counterclockwise direction, as viewed in Fig. 2. The system of gearing described hereinabove for driving the tailer roll 21 drives the shaft 97 at a rate of speed at which the peripheral rate of speed of the tailer roll 21 is about twice that at which the shear rolls 15 and 16 serve to advance the strip 9.

The slotted journal boxes 111—111 are connected by links 149—149 (Figs. 1 and 2) to arms 150—150 connected to links 151—151 fastened rigidly to a shaft 152, which is mounted rotatably in holes 155—155 formed in the frame members 107 and 108. Arms 160—160 pinned to the shaft 152 have cam followers 161—161 formed on the ends thereof. The slotted journal boxes 111—111 are urged upwardly, as viewed in Fig. 2, by the compression springs 113—113. This tends to rotate the shaft 152 in a clockwise direction and holds the cam followers 161—161 against the periphery of cams 170—170. The cams are provided with dwell portions 171—171 and lobe portions 172—172. The lobe portions 172—172 and the dwell portions 171—171 each extends substantially half way around the cams 170—170. The cams 170—170 are fastened rigidly to the shaft 51 on which the blade roll is mounted so that the cams rotate with the blade roll 15.

When the cam followers 161—161 are engaged by the dwell portions 171—171 of the cams 170—170, the compression springs 113—113 urge the tailer roll 20 away from the strip and the tailer roll 21 so that the tailer rolls 20 and 21 do not press the strip 9 therebetween, and only the tailer roll 21 engages the strip. Hence, no tension is built up upon the portion of the strip between the tailer rolls 20 and 21 and the shear rolls 50 and 60 at this time. However, before the blade 75 is rotated into engagement with the strip 9, the lobe portions 172—172 engage the cam followers 161—161 and move the cam followers 161—161 in a counterclockwise direction, as viewed in Fig. 2. This moves the journal boxes 111—111 downwardly and the tailer roll 20 is pressed into contact with the strip 9 and holds the strip 9 tightly against the tailer roll 21. When this occurs, the tailer roll 21, which is driven at a much higher peripheral rate of speed than that at which the shear rolls 15 and 16 tend to advance the strip 9, begins to tension the portion of strip 9 between the tailer rolls and the shear rolls 15 and 16, and by the time that the blade 75 is rotated to a position at which it is directed radially with respect to the anvil roll 16, at which time the blade 75 shears the strip 9 to a thin membrane, the tailer rolls 20 and 21 have built up a high tension on the portion of the strip between the tailer rolls and the shear rolls so that the thin membrane formed by the shear rolls is ruptured. This serves to form a segment, which is conveyed rapidly to the left, as viewed in Fig. 2, and the dwell portions 171—171 are rotated into engagement with the cam followers 161—161 as the compression springs 113—113 move the tailer roll 20 away from the tailer roll 21. This movement of the tailer roll 20 away from the tailer roll 21 facilitates entry of the last-mentioned segment therefrom. The shearing cycle described hereinabove then is repeated.

In the operation of the apparatus described hereinabove, the feed rolls 11 and 12 advance the strip 9 toward the left, as viewed in Fig. 2, and are rotated at a predetermined peripheral rate of speed so that they tend to advance the strip 9 to the left at a predetermined rate of speed. The tailer roll 21 is rotated at a much higher peripheral rate of speed than the feed rolls 11 and 12. Hence, when the lobe portions 172—172 of the cams 170—170 engage the cam followers 161—161, they pass the tailer roll 20 toward the tailer roll 21 so that the friction between the strip 9 and the tailer roll 21 is high.

The tailer rolls 20 and 21 tend to advance the strip 9 at a much higher rate of speed than that at which the feed rolls 11 and 12 advance the strip. This tensions the portion of the strip extending between these two sets of rolls. As this portion of the strip 9 is being tensioned, the blade 75 on the shear roll 15 is rotated into engagement with the strip, and then shears the strip to a thin membrane as the blade is moved to a position pointing radially with respect to the anvil roll 16. The severing edge 76 of the blade 75 is moved at a faster rate of speed than that of the periphery of the anvil roll 16 so that the edge 76 rubs the membrane over the periphery of the anvil roll 16. This plus the tension on the membrane ruptures the membrane so that the portion of the strip engaged by the tailer rolls 20 and 21 is sheared completely from the portion of the strip engaged by the feed rolls 11 and 12. The dwell portions 171—171 of the cams 170—170 then are rotated into engagement with the cam followers 161—161, and the tailer roll 20 is moved away from the tailer roll 21 so that the friction between the tailer roll 21 and the strip 9 is low, and the tailer roll 21 does not tension the strip substantially. The above-described shearing cycle then is repeated to shear another segment from the strip 9.

The above-described apparatus serves to shear the strip 9 into segments of uniform length. The strip is advanced continuously, and is rapidly sheared into segments. Since the feeding action of the tailer rolls 20 and 21 is faster than that of the shear rolls 15 and 16 and the feed rolls 11 and 12, the portion of the strip 9 between the tailer rolls 20 and 21 and the feed rolls 11 and 12 is placed under high tension, which tension facilitates the shearing action of the shear rolls 15 and 16. Also, the edge 76 of the blade 75 may be considerably blunter and, hence, easier to maintain in excellent servering condition than would be possible if the tension on the strip were not present.

The apparatus described hereinabove is especially useful for severing strips of highly resilient material, such as compounds including rubber or synthetic rubber-like materials, and cuts such material readily into segments or slabs that are suitable for further processing in accordance with known methods. Typical compounds that may be severed by use of such apparatus are insulating and jacketing compounds which include natural rubber, "neoprene" (polymerized chloroprene), buna or other synthetic rubber-like material.

Apparatus including some of the elements described hereinabove are disclosed and claimed in copending applications Serial No. 610,835, filed August 14, 1945 by V. A. Rayburn, now Patent 2,429,945, granted October 28, 1947, and Serial No. 610,832, filed August 14, 1945 by V. A. Rayburn and D. C. Robson, now Patent 2,429,944, granted October 28, 1947.

What is claimed is:

1. An apparatus for shearing strips of plastic material, which comprises means for advancing a strip of plastic material at a predetermined rate of speed, a pair of relatively movable rolls, means for driving the rolls to advance the strip from the strip advancing means at a rate of speed which is greater than the first-mentioned rate, means positioned between the rolls and the strip advancing means for reducing a portion of the strip to a membrane, and means for moving the rolls together and apart so that the strip is engaged tightly by both of the rolls when they are together and is engaged by only one of the rolls when they are moved apart, whereby the membrane is ruptured when the rolls are moved together.

2. In an apparatus for shearing strips of plastic material including means for engaging and advancing a strip of plastic material therepast at a predetermined rate of speed, the improvement which comprises a pair of relatively movable rolls for engaging the strip when they are moved toward one another, means for driving the rolls to advance the strip from the strip advancing means at a rate of speed which is greater than the first-mentioned rate, means positioned between the rolls and the strip advancing means for reducing a portion of the strip to a membrane, and means for moving the rolls toward and away from each other so that the strip is engaged tightly by both of the rolls when they are pressed together and is not engaged tightly by the rolls when they are moved apart, whereby the membrane is ruptured by tension while the rolls are moved together.

3. In an apparatus for shearing strips of plastic material including means for periodically reducing portions of a strip of material advanced by the feed rolls to membranes, a pair of feed rolls positioned at one side of the strip-reducing means and means for driving at least one of the feed rolls at a predetermined peripheral rate of speed, the improvements which comprises a pair of tailer rolls positioned at the other side of the strip-reducing means through which a strip advanced by the feed rolls passes, means for driving at least one of the tailer rolls at a peripheral rate of speed substantially greater than that at which the feed rolls are driven, means for periodically pressing the tailer rolls together to compress portions of the strip therebetween so that the tailer rolls tend to advance the strip at a higher rate of speed than that at which it is advanced by the feed rolls, whereby the membranes are ruptured by tension as they are formed, and means for periodically moving the tailer rolls apart so that the strip is not pressed therebetween.

4. In an apparatus for shearing strips of plastic material including a pair of feed rolls for advancing a strip of material, means positioned at one side of the feed rolls for periodically reducing portions of the strip of material to thin membranes and means for driving at least one of the feed rolls at a predetermined peripheral rate of speed, the improvement which comprises a pair of tailer rolls positioned at the opposite side of the strip-reducing means from that at which the feed rolls through which the strip passes, means for driving at least one of the tailer rolls at a peripheral rate of speed substantially greater than that at which the feed rolls are driven, means for pressing the tailer rolls together between strip-reducing operations of the strip-reducing means to periodically grip a portion of the strip therebetween so that the tailer rolls tend to advance the strip at a higher rate of speed than that at which it is advanced by the feed rolls while the strip is gripped thereby, said roll-pressing means serving to hold the rolls in gripping contact with the strip during each strip-reducing operation, whereby the strip is ruptured by tension, and means for periodically moving the tailer rolls apart so that the strip is not gripped therebetween.

5. In an apparatus for shearing strips of plastic material including a pair of opposed severing elements for reducing a strip to a thin membrane, a pair of feed rolls positioned at one side of the severing elements and means for driving the feed rolls at a predetermined peripheral rate of speed to advance a strip therebetween and to advance the strip between the severing elements, the improvement which comprises a pair of tailer rolls positioned at the opposite side of the severing elements and between which a strip of material fed by the feed rolls is advanced, means for driving at least one of the tailer rolls at a peripheral rate of speed greater than that of the feed rolls, and means for periodically forcing the tailer rolls against the strip, whereby the portion of the strip between the tailer rolls and feed rolls is placed under tension to rupture the membrane.

6. In an apparatus for shearing strips of plastic material including means for periodically reducing portions of a strip to thin films rupturable by tension, a pair of feed rolls positioned on one side of the strip-reducing means and means for rotating the feed rolls at a predetermined peripheral rate of speed so that the feed rolls tend to advance a strip of material at that rate of speed, the improvement which comprises a pair of tailer rolls positioned on the opposite side of the strip-reducing means and through which is advanced the strip advanced by the feed rolls, means for pressing one of the tailer rolls toward the other tailer roll to grip the strip therebetween, and means for rotating the last-mentioned tailer roll at a peripheral rate of speed greater than that of the feed rolls, whereby the portions of strip between the tailer rolls and the feed rolls are tensioned periodically to rupture the thin films.

7. An apparatus for shearing strips of plastic material, which comprises a pair of feed rolls, means for rotating the feed rolls at a predetermined peripheral rate of speed so that the feed rolls tend to advance a strip of material therebetween at that rate of speed, a pair of tailer rolls through which a strip of material advanced by the feed rolls is advanced, means alternately operative for holding the tailer rolls together to grip the strip of material therebetween and for holding the tailer rolls apart, means for rotating one of the tailer rolls at a peripheral rate of speed greater than that of the feed rolls so that the portion of strip between the tailer rolls and the feed rolls is tensioned when the tailer rolls are held together, and means positioned between the feed rolls and the tailer rolls and operative when the tailer rolls are held together to reduce a portion of the strip to a thin film rupturable by the tension placed upon the strip by the feed rolls and the tailer rolls.

8. In an apparatus for shearing strips of plastic material including a pair of opposed shearing elements movable into shearing relationship for reducing a portion of a strip of material to a thin film, the improvement which comprises a roll for frictionally engaging a strip positioned between the shearing elements to advance it from the shearing elements, a second roll movable toward and away from the first-mentioned roll to press the strip against the first-mentioned roll when it is moved theretoward, means for moving the second roll toward and away from the first roll, and means for actuating the roll-moving means to move the second roll toward the first roll just before the shearing elements are moved into shearing relationship, whereby the rolls tension the portion of the strip extending between the shearing elements and the rolls and rupture the thin film formed by the shearing elements.

9. An apparatus for shearing strips of plastic material, which comprises a pair of opposed shearing elements for reducing periodically portions of a strip of material to membranes, a driven roll for advancing a strip of material reduced by the shearing elements from the shearing elements when the strip is pressed thereagainst, a presser roll movable toward and away from the driven roll to press the strip against the first-mentioned roll when it is moved theretoward, and means synchronized with the shearing elements for alternately moving the presser roll against the strip and away from the strip, whereby the membranes are ruptured periodically by tension.

10. An apparatus for shearing strips of plastic material, which comprises a pair of opposed shearing elements having a shearing cycle including a shearing action for periodically reducing portions of a strip of material to membranes and an idle action, a driven roll for advancing a strip of material from the shearing elements when the strip is pressed thereagainst, a presser roll movable toward and away from the first-mentioned roll to press the strip against the first-mentioned roll when it is moved theretoward, and means for holding the presser roll against the strip for a predetermined part of the shearing cycle including the reducing action of the shearing elements and for holding the presser roll away from the strip for the rest of the shearing cycle including a portion of the idle action of the shearing elements, whereby the membranes are ruptured by tension.

11. An apparatus for shearing strips of plastic material, which comprises a pair of shear rolls for continuously advancing a strip of plastic material therebetween at a predetermined rate of speed and for periodically reducing portions of the strip to thin membranes, a stationary tailer roll over which a strip advanced by the shear rolls travels, means for rotating the stationary tailer roll at a peripheral rate of speed substantially higher than that at which the shear rolls tend to advance the strip, a movable tailer roll, means for urging the movable tailer roll away from the stationary tailer roll, a cam driven in synchronization with the shear rolls, a cam follower engaging the cam and operatively connected to the movable tailer roll to move the movable tailer roll toward the stationary tailer roll prior to the reducing action of the shear rolls so that the tailer rolls tension the portion of strip extending between the tailer rolls and the shear rolls when the shear rolls reduce one of the portions of the strip of material to a membrane, whereby the membrane is ruptured.

12. An apparatus for shearing strips of plastic material, which comprises a pair of shear rolls for advancing a strip of plastic material therebetween at a predetermined rate of speed and for periodically reducing portions of the strip to thin membranes, a driven roll, means for rotating the driven roll at a peripheral rate of speed substantially higher than that at which the shear rolls advance the strip, a freely rotatable presser roll, means for urging the presser roll away from the driven roll, a pair of matched cams driven in synchronization with the shear rolls, a pair of cam followers operatively connected to the presser roll for moving the presser roll toward the driven roll prior to the reducing action of the shear rolls and for holding the presser roll against the strip until after the reducing action of the shear rolls terminates so that the portion of strip extending between the presser and driven rolls and the shear rolls is tensioned at the time that the shear rolls reduce a portion of the strip of material to a thin membrane, whereby the tension on the membrane ruptures it.

13. An apparatus for shearing strips of plastic material, which comprises a pair of shearing elements movable into and out of shearing relationship with a strip of material, means for moving the shearing elements periodically into and out of shearing relationship with respect to a strip of material, means for gripping a strip positioned between the shearing elements and pulling the strip away from the shearing elements, and means for actuating the strip-gripping means to grip and pull the strip when the shearing elements are in shearing relationship with respect thereto, whereby the portion of the strip between the strip-gripping means and the shearing elements is tensioned and the strip is ruptured, said actuating means serving to hold the strip-gripping means out of gripping relationship with respect to the strip for at least a portion of the period during which the shearing elements are out of reducing relationship with the strip.

ESTYLE D. HANSON.
OSCAR G. NELSON.

REFERENCES CITED

The following references are of record in the file of this patent:

UNITED STATES PATENTS

| Number | Name | Date |
|---|---|---|
| 2,429,944 | Rayburn et al. | Oct. 28, 1947 |
| 2,429,945 | Rayburn | Oct. 28, 1947 |